(12) United States Patent
Glänzer et al.

(10) Patent No.: US 10,406,928 B2
(45) Date of Patent: Sep. 10, 2019

(54) METHOD FOR DETERMINING AN ARRANGEMENT OF AN ELECTRIC VEHICLE AND ARRANGEMENT DETERMINATION UNIT

(71) Applicants: Martin Glänzer, Neubiberg (DE); Ulrike Glänzer, Neubiberg (DE); Stefan Schwarzer, Taufkirchen (DE); Claus Seisenberger, Neufrannhofen (DE); Marcus Zerb, Hohenbrunn (DE)

(72) Inventors: Martin Glänzer, Neubiberg (DE); Ulrike Glänzer, Neubiberg (DE); Stefan Schwarzer, Taufkirchen (DE); Claus Seisenberger, Neufrannhofen (DE); Marcus Zerb, Hohenbrunn (DE)

(73) Assignee: Siemens Aktiengesellschaft, München (DE)

( * ) Notice: Subject to any disclaimer, the term of this patent is extended or adjusted under 35 U.S.C. 154(b) by 671 days.

(21) Appl. No.: 14/871,581

(22) Filed: Sep. 30, 2015

(65) Prior Publication Data

US 2016/0089997 A1 Mar. 31, 2016

(30) Foreign Application Priority Data

Sep. 30, 2014 (DE) .................. 10 2014 219 842

(51) Int. Cl.
*B60L 11/18* (2006.01)
*H02J 7/02* (2016.01)
(Continued)

(52) U.S. Cl.
CPC ........... *B60L 11/1829* (2013.01); *B60L 53/12* (2019.02); *B60L 53/38* (2019.02); *H02J 7/025* (2013.01);
(Continued)

(58) Field of Classification Search
CPC .................. B60L 53/38; H02J 7/025
(Continued)

(56) References Cited

U.S. PATENT DOCUMENTS

| 8,177,007 B2 | 5/2012 | Abe et al. |
| 9,712,001 B2 * | 7/2017 | Nakano ............ H02J 50/12 |

(Continued)

FOREIGN PATENT DOCUMENTS

| CN | 2777496 Y | 5/2006 |
| CN | 101567570 A | 10/2009 |

(Continued)

OTHER PUBLICATIONS

Chinese Office Action for Chinese Application No. 201510635068.1 dated Oct. 15, 2018.

*Primary Examiner* — Richard V Muralidar
(74) *Attorney, Agent, or Firm* — Lempia Summerfield Katz LLC

(57) ABSTRACT

A method for determining an arrangement of an electric vehicle relative to a charging point is provided. An alternating magnetic field is transmitted by a transmitting device arranged on the electric vehicle. The alternating magnetic field is received at a location of the charging point, and the arrangement is inferred based on the received alternating field. An arrangement determination unit is configured for use in a method of this type to determine the arrangement of the electric vehicle relative to the charging point using the received alternating field.

16 Claims, 3 Drawing Sheets

(51) Int. Cl.
  *H02J 50/10* (2016.01)
  *B60L 53/12* (2019.01)
  *B60L 53/38* (2019.01)

(52) U.S. Cl.
  CPC ........... *H02J 50/10* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
  USPC ......................................................... 320/108
  See application file for complete search history.

(56) References Cited

U.S. PATENT DOCUMENTS

| | | | |
|---|---|---|---|
| 10,020,693 B2 * | 7/2018 | Nakano | H02J 50/12 |
| 2014/0257614 A1 * | 9/2014 | Niizuma | B60L 11/182 |
| | | | 701/22 |

FOREIGN PATENT DOCUMENTS

| | | |
|---|---|---|
| CN | 101678776 A | 3/2010 |
| CN | 101917071 A | 12/2010 |
| CN | 102290875 A | 12/2011 |
| CN | 103400682 A | 11/2013 |
| CN | 103633697 A | 3/2014 |
| CN | 103946058 A | 7/2014 |
| JP | 2011205829 A | 10/2011 |
| JP | 2012242153 A | 12/2012 |
| JP | 2014147242 A | 8/2014 |
| JP | 5929418 B2 | 5/2016 |

* cited by examiner

METHOD FOR DETERMINING AN ARRANGEMENT OF AN ELECTRIC VEHICLE AND ARRANGEMENT DETERMINATION UNIT

This application claims the benefit DE 10 2014 219 842.9, filed on Sep. 30, 2014, which is hereby incorporated by reference in its entirety.

BACKGROUND

The present embodiments relate to a method for determining an arrangement of an electric vehicle relative to a charging point and an arrangement for the determination unit for determining such an arrangement.

Electric vehicles may be inductively charged with electrical energy. For this purpose, the electric vehicle includes a secondary coil that may be inductively coupled to a primary coil of a charging point. The primary coil is normally arranged in the base of a charging point so that the electric vehicle with the secondary coil may be positioned above the primary coil. The secondary coil is appropriately located on the underbody of the electric vehicle (e.g., in the area of the front axle). The primary coil and secondary coil are to be positioned as precisely as possible one above the other for the inductive charging. The positioning tolerance is a few centimeters in the direction of travel of the electric vehicle and in the direction perpendicular to the direction of travel and parallel to the ground. The maximum angle of twist, also referred to below as the yaw angle $\Psi$, around the vertical axis is only a few angular degrees. It is correspondingly difficult to position the electric vehicle suitably for the inductive charging.

A method for determining an arrangement of the electric vehicle relative to the charging point is helpful in order to support a driver of the electric vehicle when approaching a position suitable for the inductive charging of the electric vehicle. The determination of the arrangement of the electric vehicle relative to the charging point is also safety-related, since a charging release (e.g., a permission to activate the charging field of the primary coil) may be effected only if the secondary coil is located within a defined tolerance range above the primary coil.

In order to determine the arrangement of the electric vehicle relative to the charging point, it is known, by an on-board time-resolution camera, to detect the position of the primary coil in the camera image and track the position over time until this position disappears under the vehicle. Due to the temporal tracking of further image elements (e.g., carriageway boundaries) and/or the incorporation of vehicle data, such as the vehicle speed or the steering angle, the relative position and the relative orientation of the primary charging coil may be calculated without a direct line of sight. However, reliability and accuracy are not yet satisfactory.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved method for determining an arrangement of an electric vehicle relative to a charging point is provided. For example, this method is intended to be reliable (e.g., resistant to environmental influences) and precise. As another example, an arrangement determination unit that enables a method of this type is provided.

In the method according to one or more of the present embodiments for determining an arrangement of an electric vehicle relative to a charging point, an alternating magnetic field is transmitted by a transmitting device arranged on the electric vehicle. The alternating magnetic field is received at the location of the charging point. The arrangement is inferred in the method based on the received alternating field.

The method according to one or more of the present embodiments may be implemented precisely and reliably through the use of an alternating magnetic field. In comparison with optical systems, the method is particularly reliable and precise, since, in optical solutions, in the area of the primary coil, the area of the primary coil is not viewable when the electric vehicle drives over this primary coil. This problem does not arise when alternating magnetic fields are used.

The guidance of an electric vehicle when approaching and parking at a charging point may be supported by the method according to one or more of the present embodiments. At close range (e.g., with a relative offset of the primary coil and secondary coil of up to 50 cm), the method may be reliably used, and, for example, the safety-related charging release may be carried out.

In the method according to one or more of the present embodiments for determining an arrangement of an electric vehicle relative to a charging point, the transmitting device does not need to be arranged on the electric vehicle. Alternatively or additionally, in a method according to one or more of the present embodiments for determining an arrangement of an electric vehicle relative to a charging point, an alternating magnetic field is transmitted by a transmitting device arranged on or fixed in relation to the charging point. The alternating magnetic field is received at the location of the electric vehicle, and the arrangement is inferred based on the received alternating field.

In the method, data may be transmitted from the transmitter to the receiver by modulating data onto the alternating magnetic field (e.g., using the on off keying (OOK)) method, which corresponds to an amplitude shift keying (ASK) modulation with a 100% modulation index. The demodulation is possible in a correspondingly simple manner in the receiver, and the transmitted data may be used, for example, in order to identify the electric vehicle at the charging point. The positioning system would thereby have a multi-target capability (e.g., one charging point may provide support in the position determination of a plurality of approaching electric vehicles by evaluating the modulated electric vehicle identification and making the measured amplitude and phase values available to the respective electric vehicle).

The aforementioned advantages also apply accordingly to this method according to one or more of the present embodiments.

An alternating magnetic field may advantageously be configured as spatially inhomogeneous and anisotropic so that a determination of the arrangement may easily be carried out based on the spatial characteristics of the alternating field (e.g., based on the spatial radiation characteristic of the alternating magnetic field).

Two transmitter antennas, by which a time division multiplex signal is transmitted, are appropriately used in the method according to one or more of the present embodiments.

Coil antennas may be used as transmit antennas in the method according to one or more of the present embodiments.

In one advantageous development of the method, the alternating magnetic field is received by receive antennas (e.g., by coil antennas).

At least one pair or pairs of coil antennas including at least two coil antennas distanced by less than a largest coil dimension and arranged with respective coil planes oblique (e.g., perpendicular) to one another is/are used in the method as the receive antenna or receive antennas.

In one development of the method, the alternating field has a maximum frequency of 1 MHz. Through the use of a magnetic field in the frequency range up to 1 MHz, which is used to determine the position data, the method is more resistant to environmental influences than a method that operates with a higher frequency range and in which greater field differences may be expected due to multiple reflections, depending on the environment.

The directional characteristic of the received alternating field is suitably used in the method according to one or more of the present embodiments.

The yaw angle of the electric vehicle or of a secondary charging coil of the electric vehicle is appropriately determined in the method according to one or more of the present embodiments.

A power amount of an alternating field received by a pair of coil antennas or a variable derived therefrom may be used in the method.

A distance between the electric vehicle and the charging point is suitably determined in the method.

A physical vehicle model is appropriately used in the method.

An arrangement determination unit according to one or more of the present embodiments is configured for use in a method described above. The arrangement determination unit is configured to determine the arrangement of the electric vehicle relative to the charging point using the received alternating magnetic field. The arrangement may include a processor and a receive antenna.

The arrangement determination unit according to one or more of the present embodiments is appropriately configured to use signals received by one or more receive antennas.

DETAILED DESCRIPTION

Figure 1:
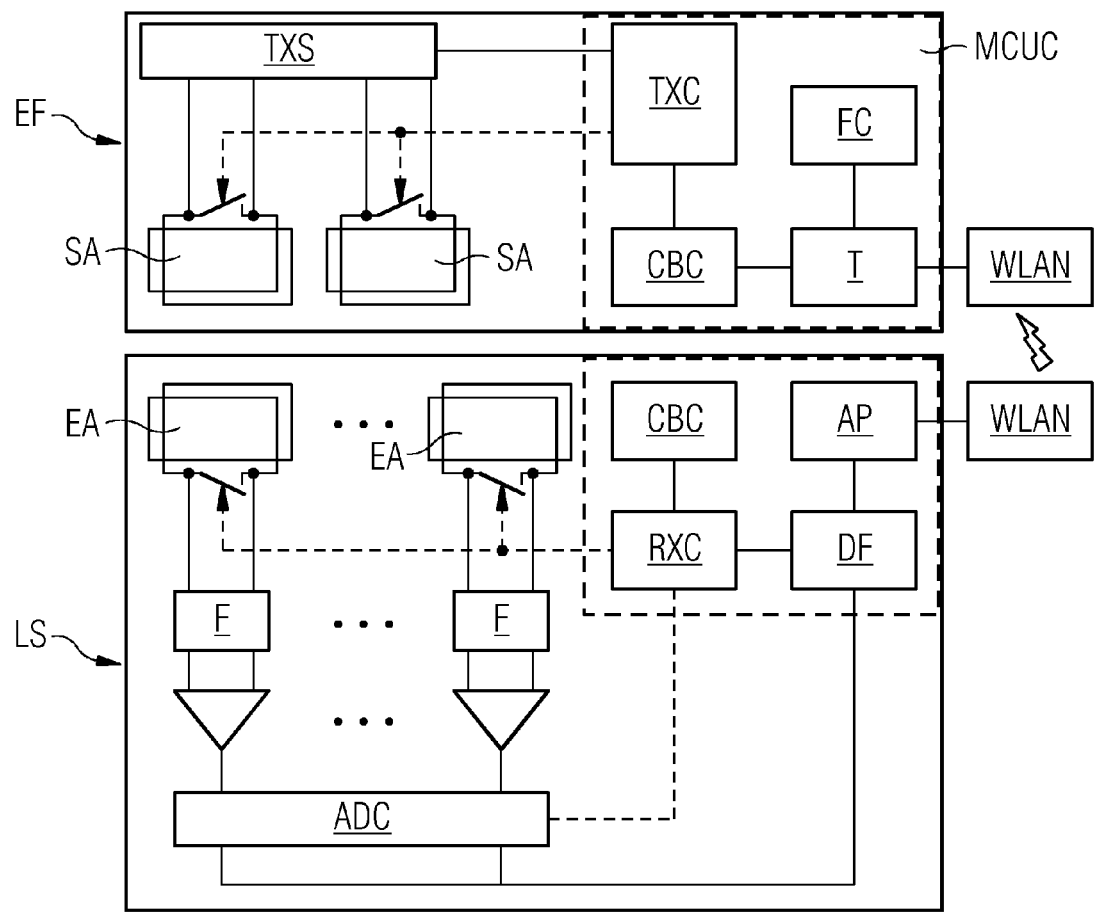
FIG. 1 shows schematically in a diagram a charging point and an electric vehicle with an arrangement determination unit to carry out an embodiment of a method.

As shown in FIG. 1, two transmit antennas, which transmit alternately at, for example, f=125 kHz using a time division multiplex method, are disposed in the area of the secondary coil (e.g., the electric vehicle EF). Four receive antennas are arranged in the area of the primary coil (e.g., at the charging point). These are grouped in each case in pairs. The two antennas in each pair are configured as coil antennas and are oriented with respective coil planes orthogonal to one another.

In this way, the receive field may be split up into spatial components orthogonal to one another (referred to below as x and y components) by each pair of coil antennas. The transmit antennas and the receive antenna pairs may in each case have the largest possible distance between one another (e.g., in different axes).

If the electric vehicle EF approaches a suitable charging point LS, a wireless data connection, by which a pairing procedure is started, is first set up by radio devices WLAN, as shown in FIG. 1. It is thus provided that a charging point may be uniquely allocated to the electric vehicle.

The transmit antennas SA are then activated on-board the electric vehicle by a transmitter control unit TXC via a CAN bus controller CBC of the electric vehicle EF. The maximum possible transmission power is initially used.

The receive antennas EA are simultaneously activated via a CAN bus controller CBC of the charging point LS. The alternating magnetic field generated on-board the electric vehicle is picked up by the receive antennas EA in the area of the primary coil (e.g., at the charging point LS), is band-limited by filters F, amplified and discretized by an AD converter ADC. In the discretized receive signals, the amplitudes and phases are calculated at the frequency of the alternating magnetic field by the calculating unit AP (e.g., by a Fourier transform DF in the form of the FFT or the Gortzel algorithm). The data is transferred via radio devices WLAN via a data connection to the microprocessor unit MCUC located in the electric vehicle EF. The microprocessor unit calculates the relative position and rotation of the primary to the secondary coil T using vehicle-specific parameters FC and the measured transmission power.

Figure 2:
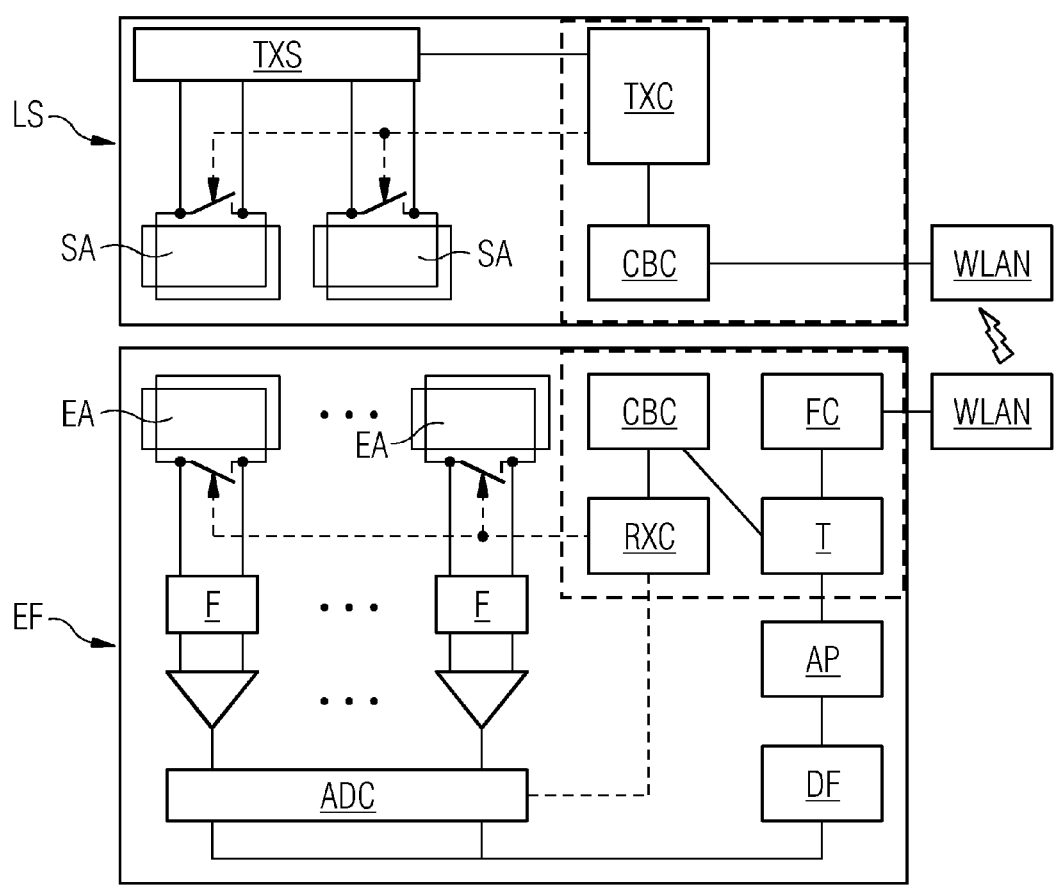
FIG. 2 shows schematically in a diagram a further example embodiment of a charging point and an electric vehicle with an arrangement determination unit.

As shown in the example embodiment according to FIG. 2, the alternating magnetic field may essentially also be emitted by the charging point LS following the pairing procedure (e.g., it is also possible to place the transmitters in the primary coil in the ground and the receivers in the secondary coil in the electric vehicle EF).

However, in this example embodiment according FIG. 2 also, the calculation of the relative position and rotation of the primary to the secondary coil (e.g., therefore the relative position of the electric vehicle EF in relation to the charging point) is carried out on-board the electric vehicle, since vehicle-specific parameters FC may easily be kept available or are easily determinable on-board the electric vehicle.

The receive filters and receive amplifiers are configured so that an inductive charging field operated nearby (e.g., at the currently discussed 85 kHz frequency) is sufficiently damped with harmonics so as not to overload the receive paths.

Since the 125 kHz signal is directly sampled without conversion, a sampling rate used that is at least twice as high as the frequency of the alternating magnetic field may be selected in order to avoid an undersampling. A multiple of this frequency that corresponds to a power of two (e.g., 500 kHz ($=2^2 \times 125$ kHz)) may be used. The amplitude and phase may be calculated efficiently using the Görtzel algorithm, which is equivalent to a very narrowband filter. As a result of this, a further, digital suppression of the signal of adjacent charging points is achieved.

Other receiver structures are fundamentally also possible (e.g., a logarithmic amplifier or a fully integrated circuit that emits field strength values).

For the following considerations, a coordinate system with an origin that is located at the center of the primary coil of the charging point is defined. The X-axis lies in the direction of travel of an electric vehicle correctly parked over the primary coil. The Y-axis extends parallel to the ground and perpendicular to the X-axis. Together with the upwardly aligned Z-access, this produces a right-handed coordinate system. The angle ψ around the Z-axis designates the yaw angle ψ of the electric vehicle around Z. ψ=0° applies in the case of a correctly parked electric vehicle. For ψ=0°, the alternating magnetic field is emitted parallel to the X-axis. The receive antenna sensitive to a field in the X-direction is referred to below as the "x-winding", and the receive antenna sensitive to a field in the Y-direction is referred to below as the "y-winding". If the field passes obliquely through a receiver pair, both windings pick up a part of the field according to the angle. If X=O, Y=O, ψ=0° are measured (or slight deviations therefrom within a defined tolerance range, referred to as the charge release zone), the vehicle is at the intended location in the intended orientation (e.g., is correctly parked for the inductive charging procedure).

Figure 3:
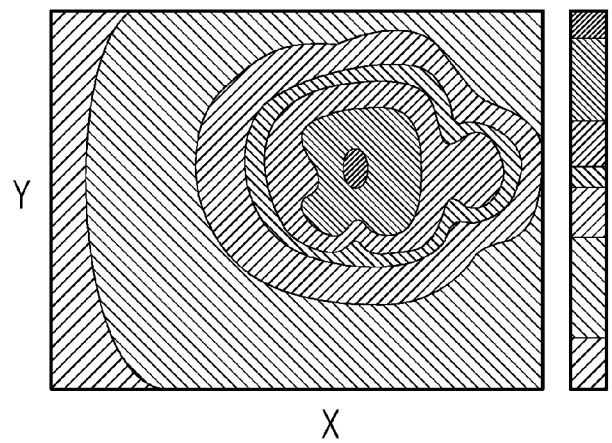
FIG. 3 shows in a schematic diagrammatic representation a total power of an orthogonal receiver coil pair of a charging point depending on a two-dimensional position of a transmitter.

FIG. 3 shows an example of the total field strength in dB on a receiver pair that is positioned at X=O and Y=O. The magnetic field has been emitted at constant power by a transmitter that has moved over the receiver in the X-direction and Y-direction at a height of around Z=15 cm without changing the alignment.

Figure 4:
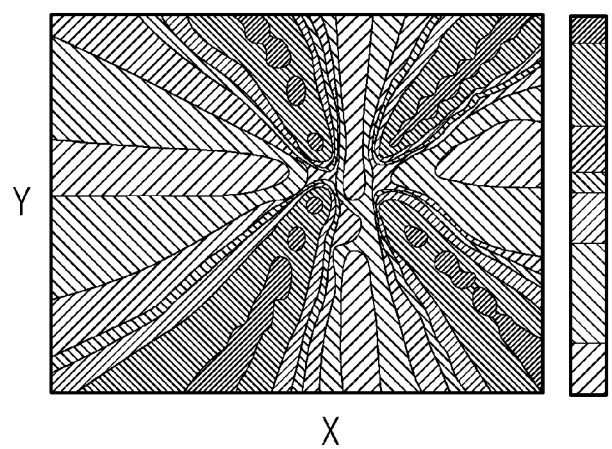
FIG. 4 shows in a schematic diagrammatic representation an angle at which the magnetic field passes through the receiver pair at a two-dimensional position.

FIG. 4 shows the characteristic of the angle φ, the angle at which the magnetic field passes through the receiver pair at the location X, Y. The field characteristics are typical of an alternating magnetic field.

In a first approximation, the total field strength is dependent only on the distance between the transmitter and receiver. The distance between the transmitter and receiver and consequently between the electric vehicle and the charging point may therefore be easily determined in this way using the alternating magnetic field.

The angle φ, at which the magnetic field passes through the receiver pair at the position X, Y, shows an approximately radial characteristic. The angle φ, which, in a first approximation, depends merely on the transmitter alignment ψ and double the angle of incidence β at the receiver (φ=ψ+2β), consequently provides information on the relative orientation of the electric vehicle in relation to the charging point.

This model MODPφ based on the total power and the angle φ calculates magnetic field parameters P and φ for each value triple X, Y, ψ.

The model is ambiguous (e.g., the same combination of P and φ is obtained at more than one position X, Y, ψ). In order to reduce the ambiguity, further values may be incorporated into the model (e.g., the information indicating which receiver pair receives a transmitter more strongly, which transmitter is more strongly received on a receiver pair, or whether the field polarity between the two windings of a receiver pair is the same or opposite). The relative phases of the two receive signals on a receiver pair, for example, are evaluated for the field polarity.

Figure 5:
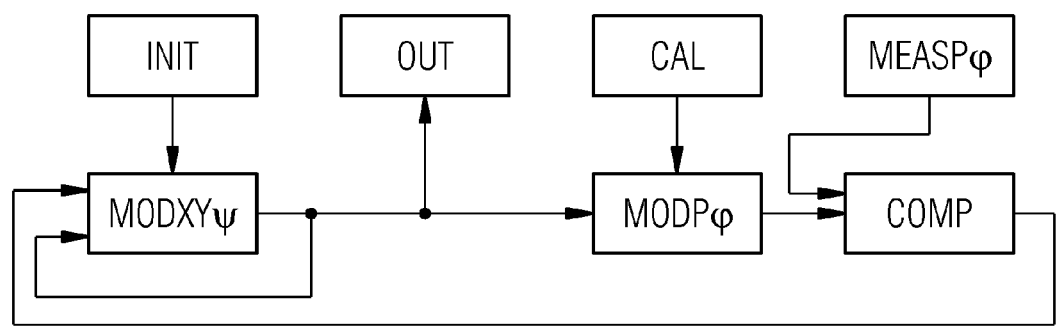
FIG. 5 shows in a diagram a structure of a tracking filter used for the arrangement determination.

The position estimation algorithm has the structure of a tracking filter shown in FIG. 5 (e.g., a Kalman filter or particle filter).

The objective OUT of the entire algorithm is that the magnetic field model and magnetic field measurements (e.g., measured values MEASPφ for P and φ) have the smallest possible deviation COMP. The model MODPφ has already been explained above and supplies the magnetic field parameters P and φ for each value triple X, Y, ψ. The calibration data CAL contain measured correction values for P and cp at support points X, Y, ψ in order to take account of deviations between the real and ideal characteristics of the magnetic field (e.g., in the area of a ferrite of the primary coil). The model MODXYΨ contains an electric vehicle model that allows physically possible movements only. Thus, for example, an electric vehicle may not travel exclusively sideways (in the Y-direction). The model is not yet defined more precisely. The speed of the electric vehicle may at least be modeled, and, where appropriate, the acceleration also. The initialization INIT of this model is difficult, and it may not be possible for the initialization to be carried out unambiguously. It may be appropriate to track a plurality of initial hypotheses until one hypothesis turns out to be the only plausible one due to the vehicle movement and further measurements.

Multi-hypothesis filters of this type are similarly known (e.g., particle filters are particularly suitable for this purpose). Further sensor values may be incorporated into the model, for example, by steering angle sensors or incremental, rotation or speed sensors on the wheels of the vehicle.

A simplified, kinematic single-track model is suitable as a kinematic vehicle model. As in the conventional single-track model, two wheels of one axle are combined in each case in one wheel in the middle of the vehicle. In addition, the reference point is still shifted into the rear axle, thereby simplifying the equations. However, it is to be provided that the following equations are NOT defined in the same coordinate system as above and still are to be transformed accordingly.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining an arrangement of an electric vehicle relative to a charging point in which an alternating magnetic field is transmitted by a transmitting device arranged on or fixed in relation to the electric vehicle, the method comprising:
   receiving the alternating magnetic field at a location of the charging point;
   inferring the arrangement based on the received alternating field; and
   activating a charging field to charge the electric vehicle when the arrangement is inferred to be within a tolerance range, wherein the inferring comprises determining an x-coordinate and a y-coordinate of the electric vehicle from an origin located at the charging point.

2. The method of claim 1, wherein the transmitting device is fixed in relation to the electric vehicle.

3. The method of claim 1, wherein the transmitting device comprises at least two transmit antennas, by which a time-division multiplex signal is transmitted.

4. The method of claim 1, wherein the at least two transmit antennas comprise coil antennas.

5. The method of claim 1, wherein the alternating magnetic field is received by receive antennas.

6. The method of claim 5, wherein the receive antennas comprise coil antennas.

7. The method of claim 5, wherein at least pairs of at least two coil antennas distanced by less than a largest coil dimension and arranged with corresponding coil planes oblique to one another are used as the receive antenna.

8. The method of claim 7, wherein the corresponding coil planes are perpendicular to one another.

9. The method of claim 1, wherein the alternating field has a frequency of at least 1 MHz.

10. The method of claim 1, wherein a directional characteristic of the received alternating field is used.

11. The method of claim 1, further comprising determining a yaw angle of the electric vehicle or of a secondary charging coil of the electric vehicle.

12. The method of claim 1, wherein a power amount of an alternating field received by a pair of coil antennas or a variable derived therefrom is used.

13. The method of claim 1, further comprising determining a distance between the electric vehicle and the charging point.

14. The method of claim 1, wherein a physical vehicle model is used.

15. An arrangement determination unit configured to determine an arrangement of an electric vehicle relative to a charging point in which an alternating magnetic field is transmitted by a transmitting device arranged on or fixed in relation to the electric vehicle, the arrangement determining unit comprising:
- a receive antenna configured to receive the alternating magnetic field at a location of the charging point; and
- a processor configured to infer the arrangement based on the received alternating field and activate a charging field to charge the electric vehicle when the arrangement is inferred to be within a tolerance range, wherein the inferring comprises determining an x-coordinate and a y-coordinate of the electric vehicle from an origin located at the charging point.

16. The arrangement determination unit of claim 15, wherein the processor is configured to use signals received by the receive antenna.

* * * * *